No. 751,933. PATENTED FEB. 9, 1904.
H. C. METZGER & W. O. GUICE.
SCOOP.
APPLICATION FILED MAR. 16, 1903.
NO MODEL.
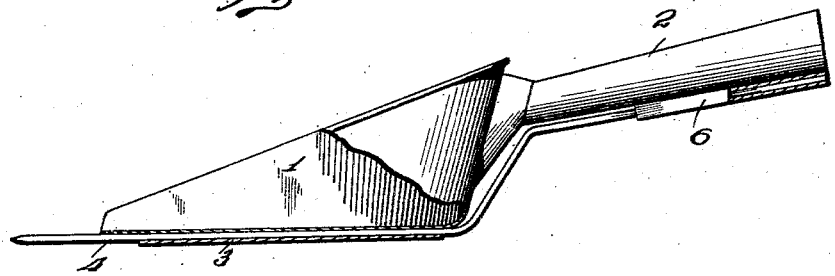
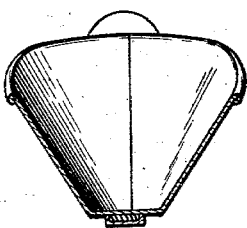
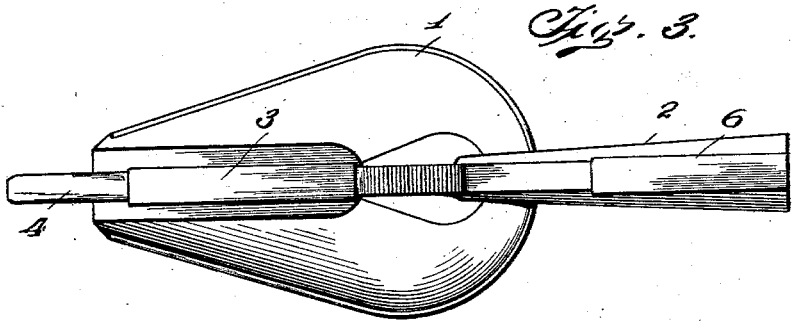

No. 751,933. Patented February 9, 1904.

UNITED STATES PATENT OFFICE.

HENRY C. METZGER AND WILLIAM O. GUICE, OF MERIDIAN, MISSISSIPPI.

SCOOP.

SPECIFICATION forming part of Letters Patent No. 751,933, dated February 9, 1904.

Application filed March 16, 1903. Serial No. 148,113. (No model.)

*To all whom it may concern:*

Be it known that we, HENRY C. METZGER and WILLIAM O. GUICE, citizens of the United States, residing at Meridian, in the county of Lauderdale and State of Mississippi, have invented certain new and useful Improvements in Scoops; and we do hereby declare the following to be a full, clear, and exact description of the invention, such as will enable others skilled in the art to which it appertains to make and use the same.

Our invention relates to improvements in scoops for grocers and others' use, the same being provided with a point or digger for loosening up the material to be handled.

The invention consists in providing a scoop and its handle with a loop upon the bottom of the scoop, said loop adapted to receive a digger which is retained in a fixed position upon the said scoop when in operation.

The invention further consists in certain other details of construction, as will be hereinafter described and specifically claimed.

The object of our invention is the production of a scoop which is provided with a digger for loosening up the material, such as evaporated fruits, salt, copperas, and other articles which have become hardened or which have so adhered or stuck together as to render them difficult to handle without being first loosened.

In the accompanying drawings, Figure 1 is a side elevation, partly in section, of the scoop constructed in accordance with our invention. Fig. 2 is a rear elevation of same, and Fig. 3 is a bottom plan view thereof.

The scoop is of ordinary construction and consists of a body portion 1 and a handle 2. The under side of the scoop is provided with a guide or loop 3, in which operates a digger or cutter 4, formed of a rigid material. This cutter or digger 4 extends, preferably, the entire length, and in fact a short distance beyond, the scoop proper when in its most forward position. In order to hold the digger or cutter steadily in position along the under side of the scoop, another loop, as 6, is preferably provided on the under side of the handle, although the said loop is not absolutely necessary for the purpose of retaining the digger in position upon the scoop, and therefore can be omitted, if desired. The said digger is bent to substantially conform to the contour of the under side of the scoop. The digger is adapted to be slid backward or forward along the scoop, so as to bring the point of the digger in rear of or back of the forward edge of the scoop proper when desired or to force said digger out beyond said forward edge when desired.

The adjustment of the digger to a retracted position when the digging portion is extended beyond the outer edge of the scoop is obtained by forcing the digging portion against an object, and by slightly releasing the grasp which the operator has upon the handle of the scoop the same may be adjusted to said retracted condition and rigidly retained in such position until it is desired to force the point of the digging portion beyond the edge of the scoop, and this operation can be easily and quickly performed by striking the handle of the digger against an object, and thereby forcing the digging portion into its extended position beyond the edge of the scoop.

It may sometimes happen that the material being scooped does not require to be loosened up, and in such case the point of the digger may be retracted to a point in the rear of the forward end of the scoop. The rear or handle end of the digger is made to fit snugly the under side of the handle of the scoop, so as to be readily and conveniently grasped by the hand of the operator in the act of loosening up the material. The digger is also, preferably, made so that it can be entirely removed when desired and can be conveniently restored to its position again whenever desired.

The invention is simple in its construction and operation and cheap of production, and the digger can be applied to scoops of ordinary construction now in the market by simply providing the guiding and retaining loops 3 and 6.

Having now described our invention, what we claim as new, and desire to secure by Letters Patent, is—

In a device of the character described, the combination with a scoop provided with a handle, of a digger provided with a handle extending to the rear of and in a parallel position with the handle of said scoop, the digging portion of said digger extending along beneath the bottom of said scoop and made of greater length than said bottom portion so that its digging portion may be extended beyond the front edge of the scoop.

In testimony whereof we hereunto affix our signatures in presence of two witnesses.

HENRY C. METZGER.
WILLIAM O. GUICE.

Witnesses:
W. E. SHOUPE,
FRED MERZ.